US010223277B2

(12) United States Patent
 Dunn

(10) Patent No.: US 10,223,277 B2
(45) Date of Patent: Mar. 5, 2019

(54) SMR DRIVE WITH MULTI-LEVEL WRITE-CACHE FOR HIGH RANDOM-WRITE PERFORMANCE

(71) Applicant: KABUSHIKI KAISHA TOSHIBA, Tokyo (JP)

(72) Inventor: Eric R. Dunn, Cupertino, CA (US)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 47 days.

(21) Appl. No.: 15/455,000

(22) Filed: Mar. 9, 2017

(65) Prior Publication Data

US 2018/0260332 A1  Sep. 13, 2018

(51) Int. Cl.
 *G06F 12/00* (2006.01)
 *G06F 12/0875* (2016.01)
 *G06F 12/1009* (2016.01)
 *G06F 3/06* (2006.01)
 *G11B 20/12* (2006.01)

(52) U.S. Cl.
 CPC ........ *G06F 12/0875* (2013.01); *G06F 3/0611* (2013.01); *G06F 3/0659* (2013.01); *G06F 3/0685* (2013.01); *G06F 12/1009* (2013.01); *G11B 20/1217* (2013.01); *G06F 2212/21* (2013.01); *G06F 2212/281* (2013.01); *G06F 2212/60* (2013.01); *G11B 2020/1238* (2013.01)

(58) Field of Classification Search
 None
 See application file for complete search history.

(56) References Cited

U.S. PATENT DOCUMENTS

| 8,856,438 B1* | 10/2014 | Warner | G06F 12/10 711/112 |
| 2013/0326154 A1* | 12/2013 | Haswell | G06F 12/0864 711/141 |
| 2015/0106568 A1 | 4/2015 | Feldman et al. | |

FOREIGN PATENT DOCUMENTS

KR   101648317 B1 *  8/2016

OTHER PUBLICATIONS

Zeng et al., "CosaFS: A Cooperative Shingle-Aware File System", Nov. 2017, ACM Transactions on Storage, vol. 13, No. 4 Article 34. Entire document. (Year: 2017).*

* cited by examiner

*Primary Examiner* — John A Lane
(74) *Attorney, Agent, or Firm* — Kim & Stewart LLP

(57) ABSTRACT

A shingled magnetic recording (SMR) hard disk drive (HDD) is configured with a multi-level cache. To expedite execution of read commands, the SMR HDD is configured to generate and store a Bloom filter in a memory that can be quickly accessed by the drive controller whenever data are stored in certain levels of the multi-level cache. When data are flushed from one level of media cache to an SMR band included in a lower level of media cache, a Bloom filter is generated based on the logical block addresses (LBAs) stored in that SMR band. Thus, when the SMR HDD receives a read command for data that are associated with a particular LBA and are stored in an SMR region of the HDD, the drive controller can query the Bloom filter for each different SMR region of the HDD in which data for that LBA can possibly be stored.

20 Claims, 8 Drawing Sheets

SMR DRIVE WITH MULTI-LEVEL WRITE-CACHE FOR HIGH RANDOM-WRITE PERFORMANCE

BACKGROUND

Magnetic hard disk drives (HDDs) have been employed in information technology as a low-cost means for providing random access to large quantities of data. Consequently, as digital technologies have greatly expanded the need for data storage in all aspects of modern life, areal density of information stored in HDDs has been continuously increased. However, there is a physical limitation for the minimum width of a write head when using conventional data recording techniques, such as perpendicular magnetic recording (PMR). This minimum width has prevented further decreases in written track width and areal density of HDDs, even though the width of a read head can be further reduced.

A recently developed technology that has further increased the areal density of magnetic HDDs is shingled magnetic recording (SMR). In an HDD that employs SMR, adjacent data tracks on a magnetic disk are each written (one group at a time) so as to overlap, and therefore overwrite, a portion of the previously written data track. As a result, the data tracks written in an SMR HDD are compressed in width to allow for increased data density in an HDD.

In addition to increased areal density, however, SMR HDDs have a significant drawback. Once a data track is written in a shingled structure, that data track cannot be updated in place because that would overwrite and destroy data in one or more adjacent and overlapping data tracks. That is, random block overwrites cannot be performed on shingled data tracks without disturbing existing data. To avoid re-writing an entire group, or "band" of shingled data tracks each time a host requests an overwrite of data within that group of tracks, data associated with write requests are commonly stored in a so-called "media cache." Typically, the media cache is located in a non-SMR region of the HDD, thereby allowing random block writes to the HDD. Such data stored in the media cache can be later written into the appropriate band in the SMR region of the HDD, along with other write data associated with that particular band. Therefore, as long as the media cache for an SMR HDD is not full, write performance of an SMR HDD can meet or exceed that of a conventional HDD.

However, once the media cache of an SMR HDD is filled, random write performance for the drive can be dramatically reduced, due to the resulting very high write amplification. Specifically, with the media cache no longer available, the SMR HDD can only receive additional write data by either writing the additional write data directly to the appropriate band in the main SMR region of the HDD, or flushing some or all of the media cache to the main SMR region of the HDD to make space available in the media cache for the additional write data. In either case, each SMR band that is refreshed (via a read-modify-write operation) is generally updated with a small amount of new data, even though the entire SMR band must be read and re-written. Thus, each refreshed SMR band is read, modified with a small number of new entries, and re-written, which results in severe write amplification. For example, when a 256 MB SMR band is read (via 64,000 4 KB read operations), modified with thirty 4 KB data blocks, and re-written (via 64,000 4 KB write operations), over 128,000 4 KB read and/or write operations are performed just to complete the thirty 4 KB write operations. Such high write amplification limits the sustained random write performance of an SMR HDD that employs a media cache as described.

As a result, a media cache that includes one or more intermediate cache levels has been introduced in some SMR HDDs, which can reduce significantly the above-described write-amplification. In such a multi-level media cache scheme, randomly received and arranged write data that are stored in a first level media cache are sorted by LBA and flushed to different second level media caches, where each second level cache is dedicated to storing data for a unique portion of the LBA space of the SMR HDD. In each second level cache, data flushed from the first level media cache are stored in monotonically increasing LBA order. Thus, when a second level cache fills and is flushed to the main disk (or to an additional media cache layer), the flushed data are not written to randomly located SMR bands on the main disk, but are instead written as ordered writes to a much smaller number of SMR bands. Consequently, a multi-level cache in an SMR HDD can greatly reduce the write amplification associated with flushing media cache.

Unfortunately, one trade-off associated with improving write performance of an SMR HDD via a multi-level media cache is that read performance generally suffers. This is because the location of data for any particular LBA included in a read command is difficult to track. For example, when a read command referencing a particular LBA is received by an SMR HDD with a three-level media cache, the data for that LBA may be stored in the main disk or in any of the three different levels of media cache. As a result, to complete a single read operation, the drive may have to seek to as many as four different locations on the disk to determine the actual location of data for the LBA. Thus, while employing a multi-level media cache in an SMR HDD can improve the write performance of the drive, the multi-level media cache can also cause read performance of the drive to suffer.

SUMMARY

One or more embodiments provide systems and methods for efficiently executing read and write commands in a shingled magnetic recording (SMR) hard disk drive (HDD). In some embodiments, an SMR HDD is configured with a multi-level write cache to expedite execution of write commands. In addition, to expedite execution of read commands, the SMR HDD is configured to generate and store a Bloom filter whenever data are stored in certain levels of the multi-level cache. Specifically, when data are flushed from one level of media cache to an SMR band included in a lower level of media cache, a Bloom filter is generated based on the logical block addresses (LBAs) stored in that SMR band. The Bloom filter is stored in a memory that can be quickly accessed by the drive controller, such as dynamic random-access memory (DRAM). Thus, when the SMR HDD receives a read command for data that are associated with a particular LBA and are stored in an SMR region of the HDD, the drive controller can query the Bloom filter for each different SMR region of the HDD in which data for that LBA can possibly be stored. A negative result from the query indicates that data for the particular LBA cannot be stored in that SMR region, and there is no need to seek a read head to that SMR region. As a result, locating data for the requested LBA does not entail sequentially seeking a read head to each possible SMR storage location for an LBA of interest and reading metadata for that SMR storage location.

A method of reading data from a magnetic disk, according to an embodiment, includes receiving a read command that references an LBA associated with a physical location on the magnetic disk, selecting a Bloom filter associated with a cache region of the magnetic disk configured for storing data for a range of LBAs that includes the LBA associated with the physical location, wherein the physical location is included in a shingled magnetic recording region, querying the Bloom filter to determine whether there is a possibility that data for the LBA associated with the physical location is stored in the cache region of the magnetic disk, and when the query indicates that there is a possibility that data for the LBA associated with the physical location is stored in the cache region, reading metadata stored in the cache region to determine whether data for the LBA associated with the physical location is stored in the cache region.

A data storage device, according to another embodiment, comprises a rotatable disk with a writable surface and a controller. The controller is configured to receive a read command that references an LBA associated with a physical location on the writable surface, select a Bloom filter associated with a cache region of the writable surface configured for storing data for a range of LBAs that includes the LBA associated with the physical location, wherein the physical location is included in a shingled magnetic recording region, query the Bloom filter to determine whether there is a possibility that data for the LBA associated with the physical location is stored in the cache region of the writable surface, and, when the query indicates that there is a possibility that data for the LBA associated with the physical location is stored in the cache region, read metadata stored in the cache region to determine whether data for the LBA associated with the physical location is stored in the cache region.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
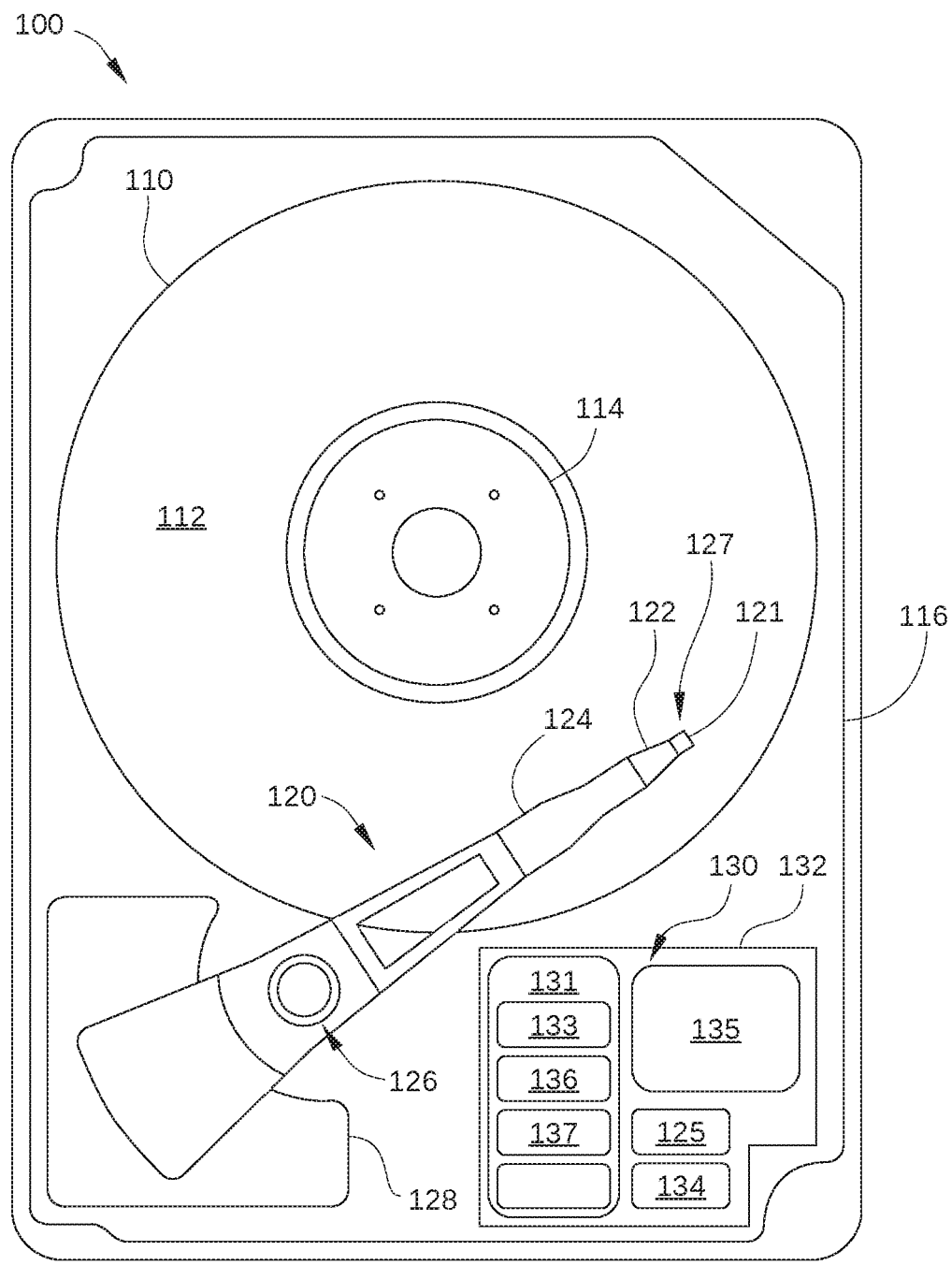
FIG. 1 is a schematic view of an exemplary hard disk drive, according to one embodiment.

FIG. 1 is a schematic view of an exemplary hard disk drive (HDD) 100, according to one embodiment. For clarity, HDD 100 is illustrated without a top cover. HDD 100 may include multiple storage disks 110 (only one of which is visible in FIG. 1) that each include one or two recording surfaces 112 on which a plurality of concentric data storage tracks are disposed. Storage disk(s) 110 are coupled to and rotated by a spindle motor 114 that is mounted on a base plate 116. An actuator arm assembly 120 is also mounted on base plate 116, and includes one or more sliders 121 (only one of which is visible in FIG. 1), each mounted on a flexure arm 122 with a magnetic read/write head 127 that reads data from and writes data to the data storage tracks of an associated recording surface 112. Each flexure arm 122 is attached to an actuator arm 124 that rotates about a bearing assembly 126. Voice coil motor 128 moves all of the multiple sliders 121 radially relative to a recording surface 112 of a storage disk 110, thereby positioning read/write head 127 over a desired concentric data storage track. Spindle motor 114, read/write head 127, and voice coil motor 128 are coupled to electronic circuits 130, which are mounted on a printed circuit board 132.

Electronic circuits 130 include a read channel 137, a microprocessor-based controller 133, a random-access memory (RAM) 134 (which may be a dynamic RAM). In some embodiments, read channel 137 and microprocessor-based controller 133 are included in a single chip, such as a system-on-chip 131. In some embodiments, HDD 100 may further include a motor-driver chip 125 that accepts commands from microprocessor-based controller 133 and drives both spindle motor 114 and voice coil motor 128. Read/write channel 137 communicates with the read/write head 127 via a preamplifier (not shown) that may be mounted on a flex-cable that is itself mounted on either base plate 116, actuator arm 120, or both.

When data are transferred to or from a particular storage disk 110 of HDD 100, actuator arm assembly 120 moves in an arc between the inner diameter (ID) and the outer diameter (OD) of the storage disk 110. Actuator arm assembly 120 accelerates in one angular direction when current is passed in one direction through the voice coil of voice coil motor 128 and accelerates in an opposite direction when the current is reversed, thereby allowing control of the position of actuator arm assembly 120 and the attached read/write head 127 with respect to the particular storage disk 110. Voice coil motor 128 is coupled with a servo system that uses the positioning data read from servo wedges on storage disk 110 by read/write head 127 to determine the position of read/write head 127 over a specific data storage track. For example, the servo system positions read/write head 127 over recording surface 112 based on positioning data read from recording surface 112.

In positioning a read/write head 127 over a recording surface 112, the servo system determines an appropriate current to drive through the voice coil of voice coil motor 128, and drives said current using a current driver and associated circuitry. Typically, the appropriate current is determined based in part on a position feedback signal of the read/write head 127, i.e., a position error signal (PES). The PES is typically generated by using servo patterns included in the servo wedges (not shown) on the recording surface 112 as a reference. One embodiment of a recording surface 112 is illustrated in FIG. 2.

Figure 2:
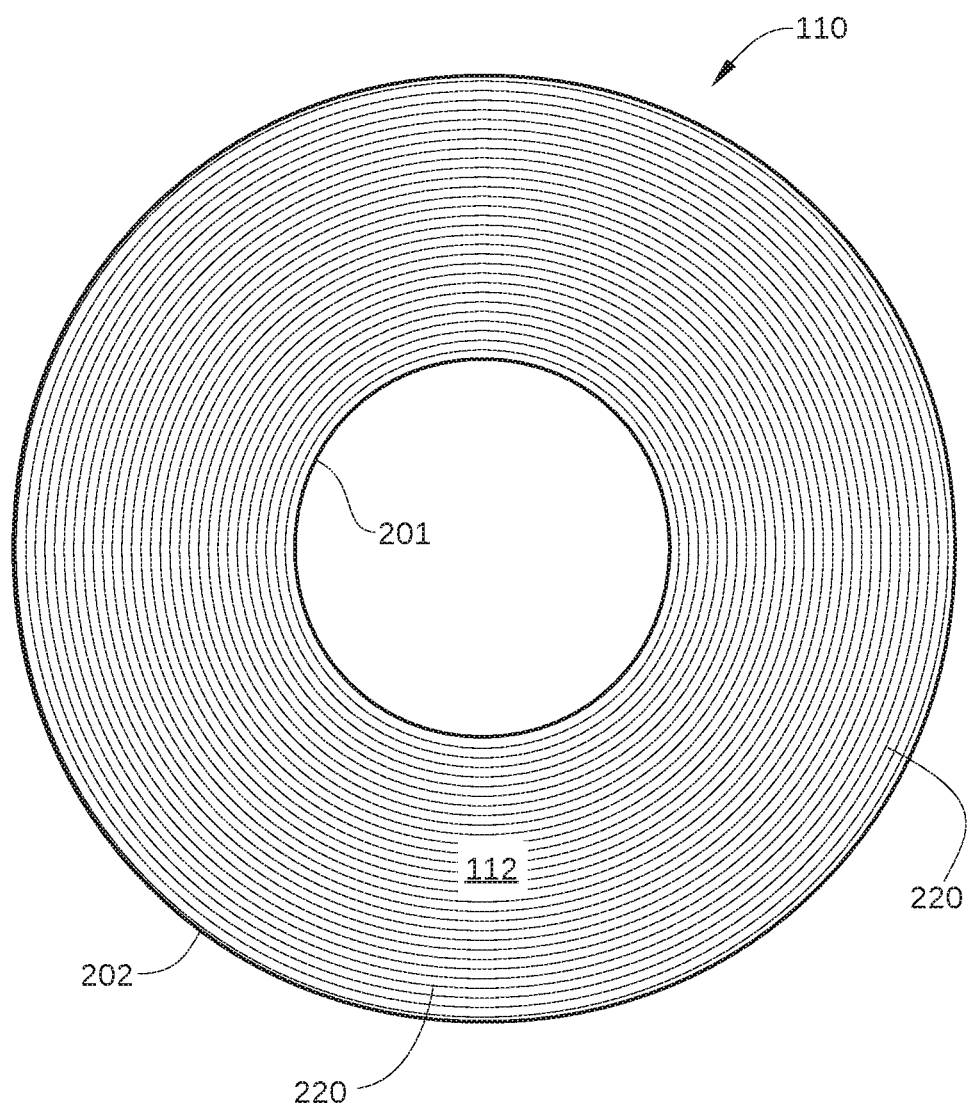
FIG. 2 schematically illustrates a recording surface of a storage disk with concentric data storage tracks formed thereon, according to an embodiment.

FIG. 2 schematically illustrates a recording surface 112 of a storage disk 110 with concentric data storage tracks 220 formed thereon, according to an embodiment. Data storage tracks 220 are formed on recording surface 112 between an ID 201 and an OD 202 of storage disk 110. Data storage tracks 220 are configured for storing data, and the radial position and track pitch, i.e., spacing, of data storage tracks 220 is defined by servo sectors (not shown) formed on recording surface 112. Each servo sector contains a reference signal that is read by read/write head 127 during read and write operations to position read/write head 127 above a desired data storage track 220. Typically, the actual number of data storage tracks 220 included on recording surface 112 is considerably larger than illustrated in FIG. 2. For example, recording surface 112 may include hundreds of thousands of concentric data storage tracks 220. The majority of data storage tracks 220 are disposed in a user region of recording surface 112, while the remainder of data storage tracks 220 are disposed in a media-cache region, as shown in FIG. 3.

Figure 3:
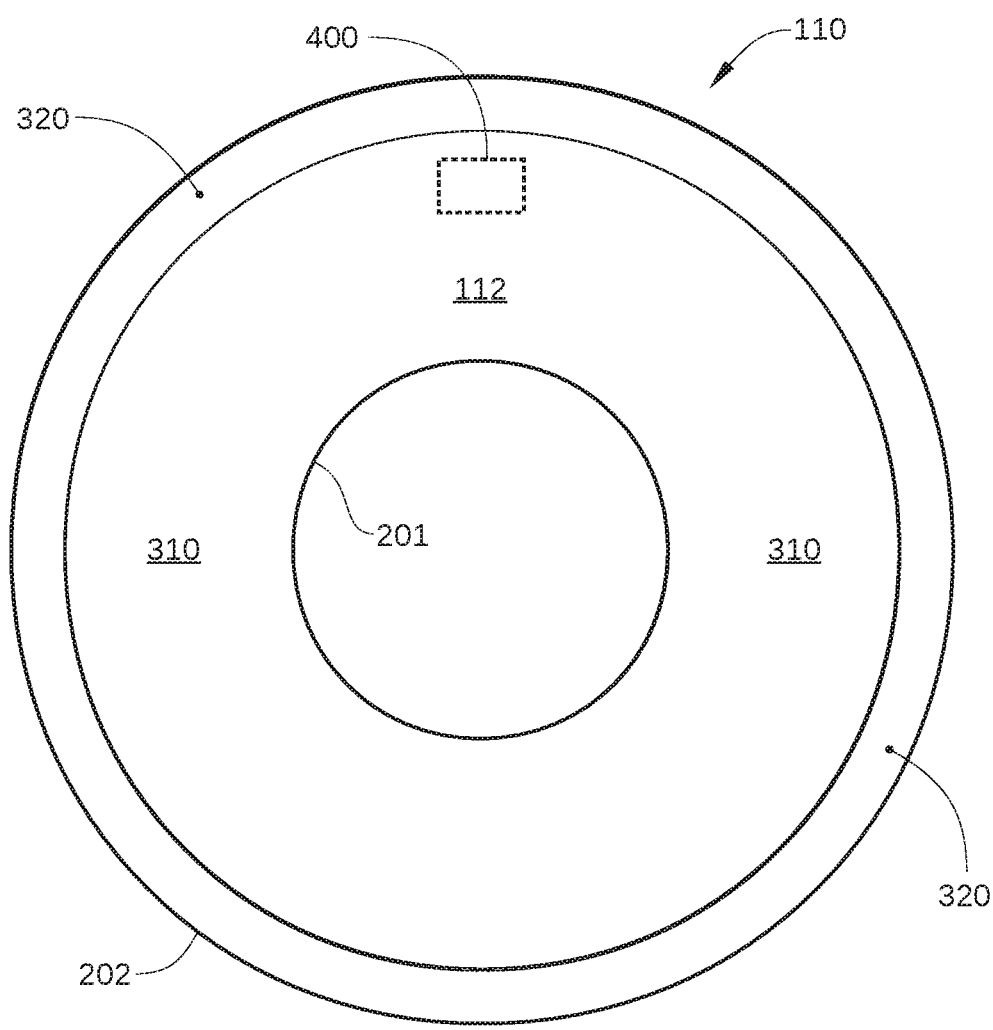
FIG. 3 schematically illustrates a user region of a recording surface and a media-cache region of the recording surface, according to an embodiment.

FIG. 3 schematically illustrates a user region 310 of recording surface 112 and a media-cache region 320 of recording surface 112, according to an embodiment. For clarity, data storage tracks 220 formed on recording surface 112 are not shown in FIG. 3. In the embodiment illustrated in FIG. 3, media-cache region 320 is disposed proximate OD 202 of recording surface 112 and user region 310 includes the remainder of recording surface 112. In other embodiments, media-cache region 320 may be disposed in any other region of recording surface 112, for example proximate ID 201, or a middle diameter (MD) region of recording surface 112. Generally, user region 310 includes the majority of the storage capacity of recording surface 112.

User region 310 is a shingled magnetic recording (SMR) region of recording surface 112 that includes data storage tracks 220 that are arranged in groups, or "bands" of data storage tracks. Each band of data storage tracks is separated from adjacent bands by guard regions, which are inter-band gaps in which no data tracks are formed. Further, the data storage tracks formed in user region 310 are written in an SMR format, and therefore overlap adjacent data tracks in the same band. Thus, each band in user region 310 includes a plurality of overlapping data tracks that each have a width that is significantly narrower than a width of the write element included in read/write head 127. One embodiment of such a band is illustrated in FIG. 4.

Figure 4:
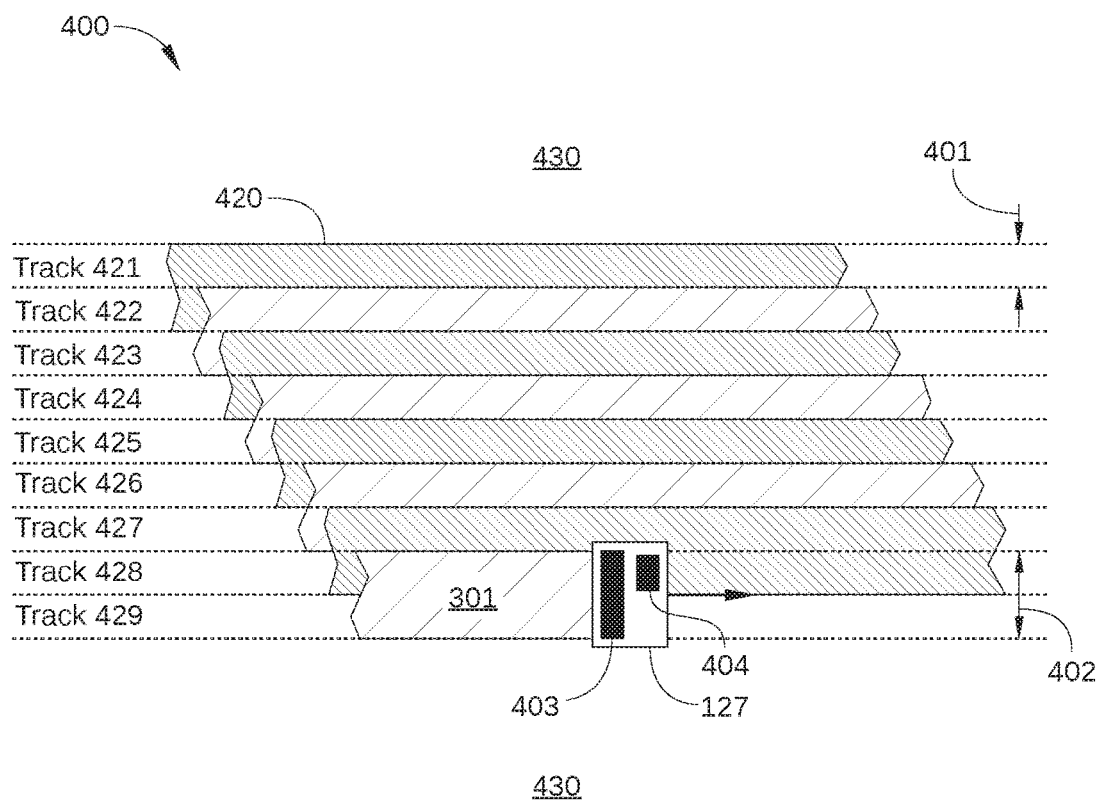
FIG. 4 is a schematic illustration of a portion of a recording surface indicated in FIG. 3 that includes a band of SMR data tracks, according to an embodiment.

FIG. 4 is a schematic illustration of a portion 400 of recording surface 112 indicated in FIG. 3 that includes a band 420 of SMR data tracks, according to an embodiment. Band 420 includes a plurality of SMR data tracks 421-429, and is separated from adjacent bands (not shown) by guard regions 430. As shown, each of SMR data tracks 421-429 overlaps and/or is overlapped by at least one adjacent SMR data track. As a result, each of SMR data tracks 421-429 has a readable width 401 that is significantly less than an as-written width 402. It is noted that in the embodiment illustrated in FIG. 4, band 420 only includes nine SMR data tracks, whereas in practice band 420 may include up to one hundred or more SMR data tracks.

Also shown in FIG. 4 is read/write head 127, which is configured with a write head 403 and a read head 404 that are formatted for SMR. As such, read head 404 is configured with a width that is approximately equal to readable width 401, and is positioned within read/write head 127 to facilitate reading of SMR data tracks 421-429. Furthermore, write head 403 is positioned within read/write head 127 to facilitate writing of SMR data tracks 421-429 with as-written width 402. In accordance with the principle of SMR, as-written width 402 exceeds readable width 401, for example by a factor of two. Thus, as a particular one of SMR data tracks 421-429 is written, write head 403 is positioned to overlap a significant portion of the preceding SMR data track.

Returning to FIG. 3, media-cache region 320 is configured to store media-cache entries in a multi-level media cache during normal operation of HDD 100. As such, media-cache region 320 can include a combination of SMR data storage tracks and conventional data storage tracks, also referred to herein as conventional magnetic recording (CMR) data storage tracks. CMR data storage tracks that are not written in an SMR format, and therefore are not overlapping. Thus, data storage tracks in the CMR portion of media-cache region 320 can be used to store random block writes without an entire band of shingled tracks being re-written for each write command received. For example, when HDD 100 receives a write command that includes write data and a range of logical block addresses (LBAs) that correspond to physical locations (such as sectors) in user region 310 for the storage of the write data, the write data can first be written to a physical location in the CMR portion of media-cache region 320, referred to herein as a "first-level media cache." Thus, for a particular write command, write data are initially stored in the first-level media cache of HDD 100, rather than to the physical locations of user region 310 that correspond to the LBA range referenced in the write command. To reduce the write-amplification associated with copying data stored in media cache to user region 310, HDD 100 is configured with a multi-level media cache. One such embodiment is illustrated in FIG. 5.

Figure 5:
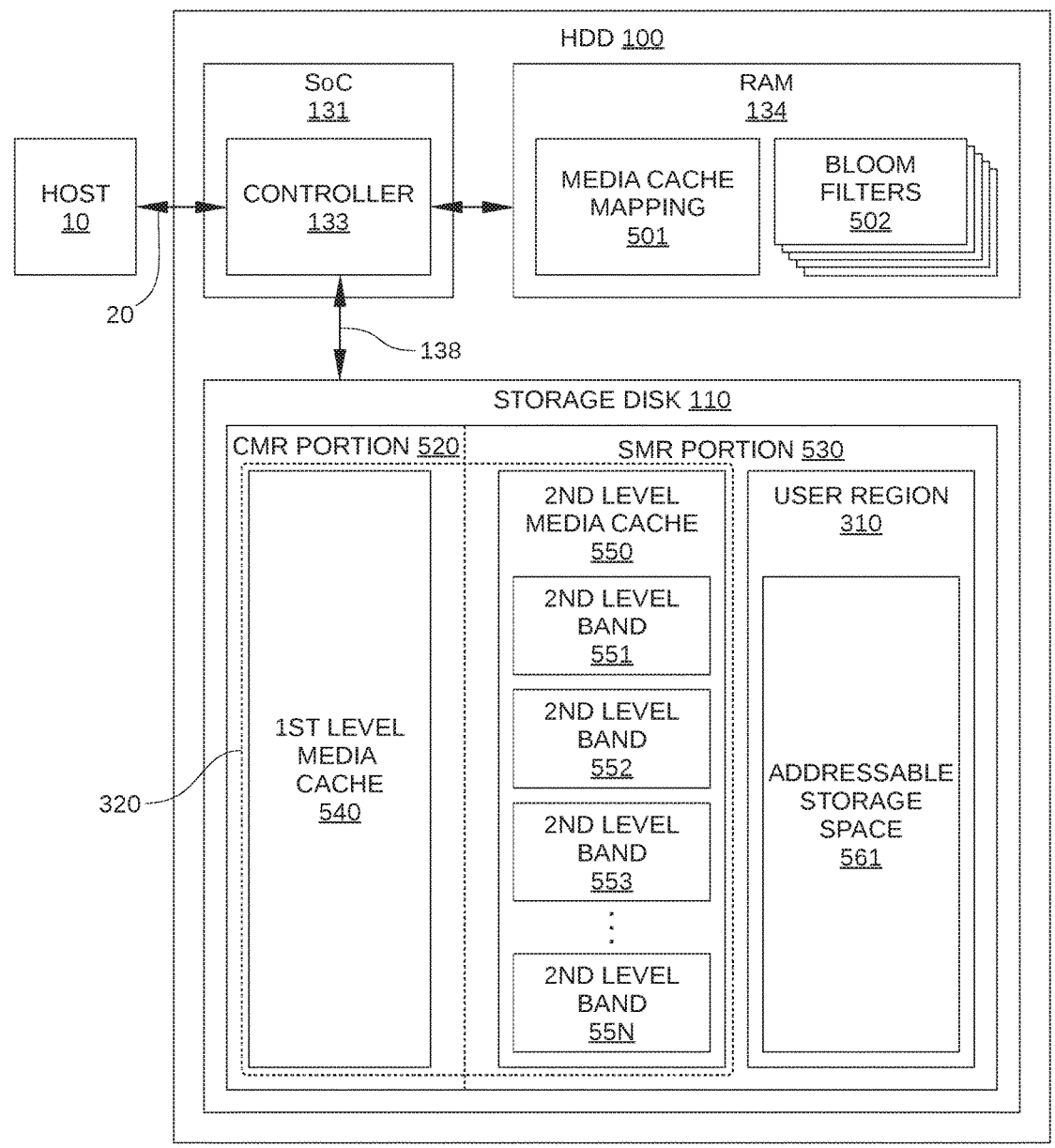
FIG. 5 is a block diagram illustrating an HDD configured with a storage disk that includes a multi-level media cache, according to an embodiment.

FIG. 5 is a block diagram illustrating HDD 100 configured with a storage disk 110 that includes a multi-level media cache, according to an embodiment. HDD 100 is connected to a host 10, such as a host computer, via a host interface 20, such as a serial advanced technology attachment (SATA) bus or a serial attached SCSI (SAS) bus. As shown, storage disk 110 includes a CMR portion 520 and an SMR portion 530. CMR portion 520 includes a first-level media cache 540, whereas SMR portion 530 includes user region 310 as well as one or more intermediate levels of media cache. Thus, media-cache region 320 of FIG. 3 generally includes all of CMR portion 520 as well as a part of SMR portion 530. In the embodiment illustrated in FIG. 5, storage disk 110 is depicted with a single intermediate level of media cache between first-level media cache 540 and user region 310, i.e., second-level media cache 550. In other embodiments, SMR portion 530 includes two or more intermediate levels of media cache.

First-level media cache 540 is configured to store write data, i.e., data included in write commands received from host 10. In some embodiments, the physical location at which write data are stored in first-level media cache 540 is mapped to the LBAs associated with the write data, so that the write data can be retrieved based on LBAs included in a subsequent read command. In such embodiments, suitable pointers or other mapping information may be stored in a media-cache mapping 501 in RAM 134, and can be quickly accessed by microprocessor-based controller 133 whenever a read command is received from host 10. Thus, microprocessor-based controller 133 can determine with low latency whether data associated with a particular LBA are stored in first-level media cache 540.

Second-level media cache 550 includes a plurality of second-level bands 551-55N, where N equals the "fanout" of first-level media cache 540, i.e., the number of child caches associated with first-level media cache 540. Each of second-level bands 551-55N is an SMR band included in SMR portion 530 of storage disk 110, and is configured to store write data, sorted in LBA order, that have been flushed from first-level media cache 540. Second-level bands 551-55N are described in greater detail below in conjunction with FIG. 6. User region 320 includes an addressable storage space 561, which is the group of physical locations, for example disk sectors, that are configured to store data associated with the logical space that are available for use by host 10, for example a range of LBAs. Thus, any data stored by HDD 100 for host 10 are associated with an LBA or range of LBAs known to host 10.

In the embodiment illustrated in FIG. 5, HDD 100 includes a single intermediate media cache level, i.e., second-level media cache 550. In other embodiments, one or more additional intermediate media cache levels may be included in HDD 100 between first-level media cache 540 and user region 310, such as a third-level media cache, a fourth-level media cache, and so on. In such embodiments, each band of one intermediate media cache level fans out to multiple bands. similar to how first-level media cache 540 fans out to the multiple second-level bands 551-55N of second-level media cache 550.

It is noted that the quantity of metadata sufficient to track the LBAs and physical locations of all data stored in all of second-level bands 551-55N can be prohibitively large for storage in RAM 134. As a result, confirming whether data for a particular LBA is stored in second-level media cache 550 can involve seeking read/write head to one of second-level bands 551-55N and reading band metadata stored in that band, which is a relatively slow process. When HDD 100 includes additional levels of media cache, even more seeks may be required before the data for the particular LBA are located. According to embodiments of the disclosure, Bloom filters 502 are employed to prevent the need to seek to a physical location corresponding to an intermediate level of a media cache before determining whether data are actually located in that intermediate level of the media cache.

Bloom filters 502 are stored in RAM 134, one corresponding to each of second-level bands 551-55N. For embodiments in which HDD 100 is configured with multiple intermediate cache levels, a Bloom filter 502 is stored in RAM 134 for each band included in the multiple intermediate cache levels. For example, in an embodiment in which HDD 100 is configured with 23 second-level bands 551-55N, and each of second-level bands 551-55N fans out to 37 child bands that make up another intermediate cache level, RAM 134 stores 874 (23×38) Bloom filters 502. Each of second-level bands 551-55N (and the SMR bands associated with additional intermediate cache levels) stores data for a set of specific LBAs, and each Bloom filter 502 is configured to indicate whether an LBA requested by host 10 is included in the set of LBAs stored in a corresponding second-level band 551-55N (or other SMR band), as set forth below.

Each Bloom filter 502 includes an array or string of M bits, and multiple (for example, k) associated hash functions, where each hash function is configured to generate a position in the array of M bits, based on an input. To generate a specific Bloom filter 502 for a particular set of interest, for each element included in the set of interest, the array of M bits is populated with a value for k array positions by feeding an input associated with the element to the k hash functions. That is, in the context of HDD 100, to generate a specific Bloom filter 502 for a particular second-level band, third-level band, etc., for each LBA for which data are stored in the particular band, the array of M bits is populated with a value for a total of k array positions, where the k array positions are generated by feeding an input associated with the LBA to the k hash functions. The input associated with a specific LBA may be any unique identifier associated with the LBA. For example, in some embodiments, such a hash function input may be based at least in part on an LBA number, a corresponding sector number, etc.

To determine whether an LBA requested by host 10 is included in the set of LBAs stored in a particular second-level band 551-55N (or in a particular SMR band in another intermediate level media cache), the Bloom filter 502 corresponding to that particular media cache band is queried. A query of a Bloom filter 502 can be performed by microprocessor-based controller 133 by feeding a unique input associated with the LBA of interest to the k hash functions of the Bloom filter 502 being queried to generate a value for k array positions in the array of M bits of the Bloom filter. The generated k array positions are referenced in the array of M bits, and if the value at any of the referenced array positions stored in RAM 134 is 0, there is no possibility that data for the LBA of interest is stored in the SMR band that corresponds to the Bloom filter being queried. However, if the value of all of the referenced array positions stored in RAM 134 is 1, there is a very high probability that data for the LBA of interest is stored in the SMR band that corresponds to the Bloom filter being queried. Consequently, read/write head 127 can seek that SMR band so that band metadata for that SMR band can be read and, when data for the LBA of interest is stored in that SMR band, the data can be read. Fewer than 10 bits per element (i.e., per LBA stored in an SMR band) are required for a 1% false positive probability, independent of the size or number of elements in the set. Thus, by querying Bloom filters 502, the number of unnecessary seeks to intermediate level media caches to locate data for a requested LBA can be greatly reduced, at the cost of occupying a relatively small portion of RAM 134.

Figure 6:
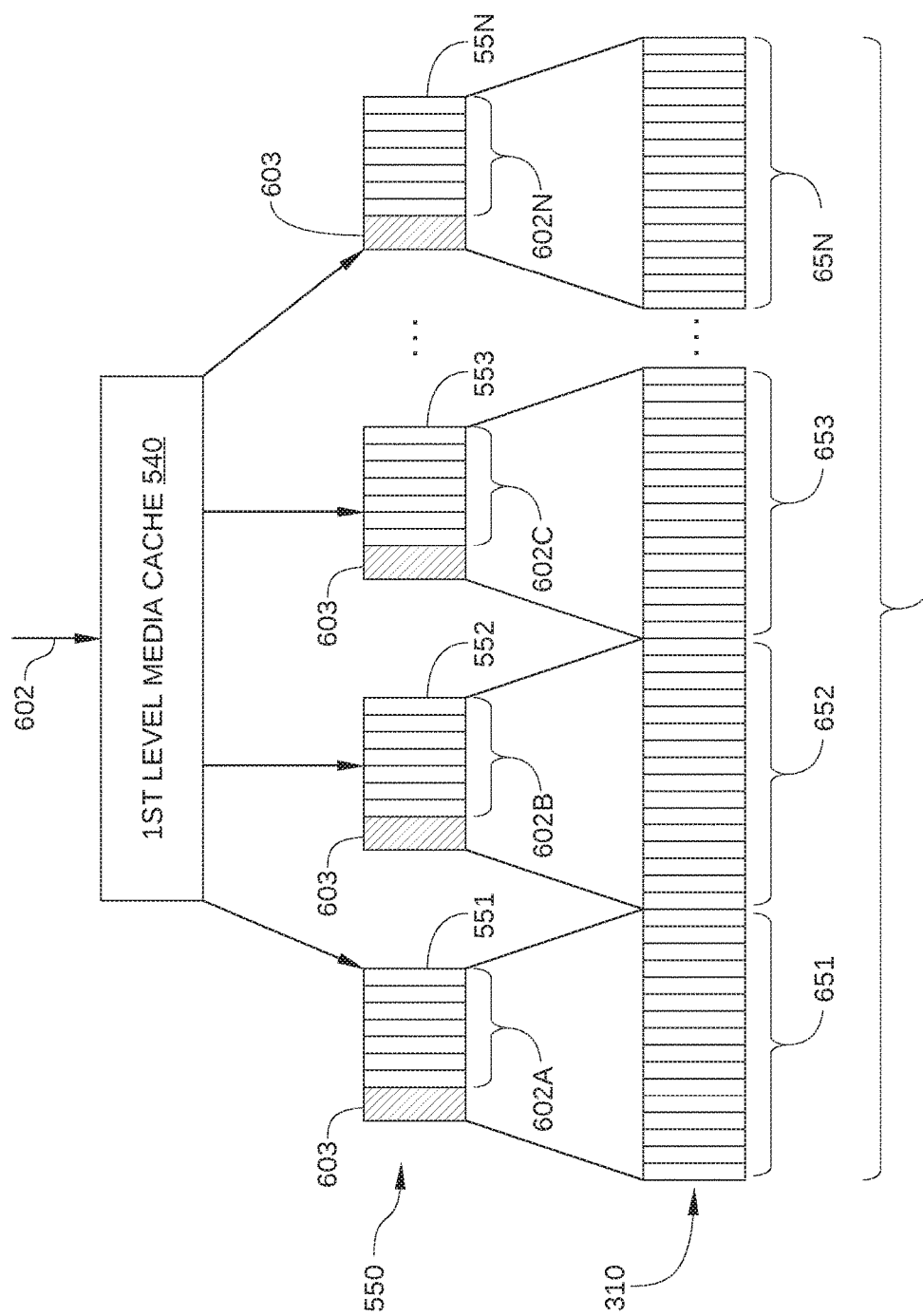
FIG. 6 is an operational diagram of the HDD of FIG. 5 and the multi-level media cache associated therewith, configured according to one embodiment.

FIG. 6 is an operational diagram 600 of HDD 100 and the multi-level media cache associated therewith, configured according to one embodiment. Operational diagram 600 includes first-level media cache 540, the second-level bands 551-55N of second-level media cache 550, and a full range of LBAs 601 associated with user region 310.

Each of second-level bands 551-55N is associated with a single, unique LBA extent from full range of LBAs 601. For example, in the embodiment illustrated in FIG. 6, second-level band 551 is associated with LBA extent 651, second-level band 552 is associated with LBA extent 652, second-level band 553 is associated with LBA extent 653, and so on. As shown, LBA extents 651-65N do not overlap with each other in the logical space (i.e., LBA space) represented by full range of LBAs 601. Therefore, when write data 602 are flushed to second-level media cache 550 from first-level media cache 540, write data 602A for LBAs included in LBA extent 651 are stored in second-level band 551, write data 602B for LBAs included in LBA extent 652 are stored in second-level band 552, write data 602C for LBAs included in LBA extent 653 are stored in second-level band 553, and so on.

Data stored in each of second-level bands 551-55N may be stored in ascending (or descending) LBA order. That is, when write data 602A in second-level band 551 are updated with additional or newer entries from first-level media cache 540, write data 602A may be sorted by LBA order and re-written in monotonically ascending (or descending) order. Thus, even though second-level band 551 does not necessarily store data for a sequential set of LBAs, when some or all of write data 602A are flushed to user region 310 (or to another intermediate cache level), the flushed data can be read in a single sequential operation, rather than a plurality of random reads scattered throughout second-level band 551. Furthermore, when a portion of write data 602A are flushed to a child media cache (not shown), only the portion of second-level band 551 that includes the range of LBAs associated with that child media cache need to be read, rather than all of second-level band 551. Consequently, the process of flushing data from second-level band 551 to LBA extent 651 (or to a smaller LBA extent in a child media cache) is significantly more time-efficient than flushing data randomly scattered throughout first level media cache 540 to LBA extent 651.

It is noted that the total data storage area of second-level bands 551-55N is significantly less than the total data storage area of user region 310. For example, in one embodiment, HDD 100 may include a user region 310 with physical locations capable of storing on the order of 1 TB of data, and a second-level media cache 550 with physical locations capable of storing on the order of 4 GB of data (e.g., 128 SMR bands each capable of storing 32 MB). The total data storage area of second-level bands 551-55N may be less than, equal to, or greater than the total data storage area of first-level media cache 540, although generally the total data storage area of second-level bands 551-55N is greater than the total data storage area of first-level media cache 540.

In addition to write data 602 that have been flushed from first-level media cache 540, each of second-level bands 551-55N includes band metadata 603. For a particular second-level band, band metadata 603 includes information indicating what LBAs correspond to the data currently stored in that band and what physical locations in that band are currently storing the data for each LBA. Consequently, write data 602 that are stored in second-level media cache 550 can be retrieved by HDD 100 even though not stored in the physical location corresponding to the LBA(s) associated with write data 602, i.e., in user region 310.

In operation, HDD 100 receives write data 602 from host 10 and stores write data 602 in first-level media-cache 540. Write data 602 are received and then typically written to physical locations in first-level media cache 540 in arrival order, therefore write data 602 stored in first-level media cache 540 are generally in substantially random LBA order. For example, in some embodiments, first-level media cache 540 is utilized as a circular buffer, where the newest entry stored therein overwrites the oldest entry. In such embodiments, to make storage space available in first-level media cache 540 for new write data 602, the oldest entry in first-level media cache 540 is flushed to an appropriate second-level band in second-level media cache 550. Write data 602 are flushed under certain conditions, such as when HDD 100 is determined to be idle, when first-level media cache 540 is full or nearly full, and/or when an SMR band in second-level media cache 550 is determined to be empty or nearly empty, among others. Any other suitable criterion may be employed by microprocessor-based controller 133 to determine whether write data 602 should be flushed to one or more of second-level bands 551-55N.

When write data 602 are flushed from first-level media cache 540, data are copied from first-level media cache 540 to an appropriate SMR band in second-level media cache 550. In such embodiments, some or all write data 602 associated with the LBAs for a specific one of LBA extents 651-65N, for example LBA extent 651, are read from first-level media cache 540. The second-level band corresponding to that LBA extent, for example second-level band 551, is then read, modified with the write data 602 read from first-level media cache 540, and rewritten. Prior to being rewritten, or during the rewriting process, the newly added or updated write data 602A are sorted in LBA order, so that second-level band 551 stores write data 602A in monotonically increasing (or decreasing) LBA order. In the sorting process, data associated with repeated LBAs are discarded, so that the most recently received data for a given LBA is retained.

In the embodiment illustrated in FIG. 6, first-level media cache 540 has a fanout of N, and HDD 100 includes a single intermediate media cache level. In general, the number of additional levels of media cache employed by HDD 100, and the fanout of each additional intermediate level of media cache can be selected to minimize or otherwise reduce write amplification in HDD 100.

Figure 7:
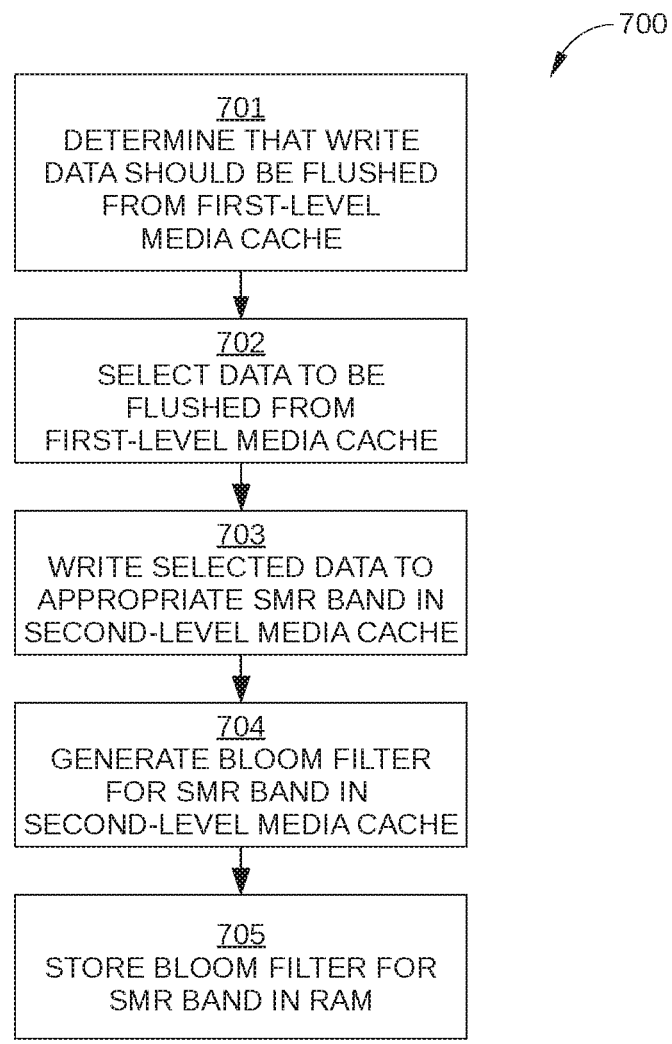
FIG. 7 sets forth a flowchart of method steps for storing data in an SMR HDD that includes a media-cache region, according to an embodiment.

FIG. 7 sets forth a flowchart of method steps for storing data in an SMR HDD that includes a media-cache region, according to an embodiment. Although the method steps are described in conjunction with HDD 100 in FIGS. 1-6, persons skilled in the art will understand that the method steps may be performed with other types of systems, such as a hybrid HDD that includes a flash memory device. The control algorithms for the method steps reside in microprocessor-based controller 133 in whole or in part as software- or firmware-implemented logic, and/or as hardware-implemented logic circuits.

As shown, a method 700 begins at step 701, when microprocessor-based controller 133 determines that write data 602 should be flushed from first-level media cache 540. As noted previously, the determination that write data 602 should be flushed from media cache 540 may be based on any suitable criterion or criteria. In some embodiments, microprocessor-based controller 133 makes such a determination when HDD 100 is determined to be idle, so that first-level media cache 540 is emptied partially or fully at a time that does not affect the performance of HDD 100. Additionally or alternatively, in some embodiments microprocessor-based controller 133 makes the determination that write data 602 should be flushed when first-level media cache 540 is full or nearly full. For example, in some embodiments first-level media cache 540 is considered full or nearly full when first-level media cache 540 stores a quantity of data that exceeds a predetermined threshold quantity. Additionally or alternatively, in some embodiments microprocessor-based controller 133 makes the determination that write data 602 should be flushed when one or more of second-level bands 551-55N is determined to be empty or nearly empty. For example, in some embodiments a second level band is considered to be empty or nearly empty when the second-level band stores a quantity of invalid data that exceeds a predetermined threshold quantity. Such a determination may be facilitated by a counter stored in RAM 134 for each of second-level bands 551-55N.

In step 702, microprocessor-based controller 133 selects data to be flushed from first-level media cache 540. For example, in embodiments in which first-level media cache 540 is employed as a circular buffer, the oldest entry is selected, i.e., the LBA for which data has been stored in media cache 540 for the longest time and/or is indicated by a read point of the circular buffer. The LBA extent that includes the oldest entry is then determined, and some or all other data stored in first-level media cache 540 that are associated with an LBA included in that LBA extent are also selected. Generally, the selection of such data that are associated with an LBA included in that LBA extent is performed based on media-cache mapping 501. Because media-cache mapping 501 is stored in RAM 134, such a selection process can be performed relative quickly compared to other operations performed by HDD 100, such as read and write operations.

Alternatively, in some embodiments, microprocessor-based controller 133 may select data to be flushed based on which of second-level bands 551-55N is determined to be able to receive the most flushed data from first-level media cache 540. For example, in such embodiments, the number of LBAs associated with data stored in first-level media cache 540 and included in a each of LBA extents 651-65N is calculated based on media cache mapping 501. Then, the LBA extent for which the most LBAs associated with data stored in first-level media cache 540 is determined. Finally, data associated with LBAs included in that LBA extend are selected to be flushed from first-level media cache 540 to the appropriate second-level band.

In step 703, microprocessor-based controller 133 then causes the data selected in step 702 to be written to the appropriate second-level band. It is noted that the data selected in step 702 are all associated with an LBA included in the same LBA extent, and therefore can all be written to the same second-level band. As a result, the data to be flushed are concentrated in a single second-level band, which is rewritten in a single read-modify-write operation. Thus, a portion of the randomly arranged write data 602 are flushed in a single read-modify-write operation to a single second-level band, thereby reducing the write amplification associated with flushing data that are not arranged in LBA order from a first-level media cache to an SMR user region, such as user region 310. Furthermore, in some embodiments, the data written to the second-level band in step 703 may be sorted and written in monotonically increasing or decreasing order.

In step 704, microprocessor-based controller 133 generates a Bloom filter 502 for the second-level band to which the selected data are flushed in step 703. For example, in some embodiments, microprocessor-based controller 133 employs k hash functions to generate an array of M bits having a value of 1 or 0 at each array position. The Bloom filter 502 for the second-level band is generated by feeding a unique input value (such as an LBA identifier) to the k hash functions for each LBA for which data are stored in the second-level band.

In step 705, microprocessor-based controller 133 stores the Bloom filter 502 generated in step 704 in RAM 134 or any other solid-state memory included in electronic circuits 130 of HDD 100. In some embodiments, a copy of the Bloom filter 502 is stored in a non-volatile location, such as in a flash memory device or in a physical location in CMR portion 520 of disk 110.

The implementation of method 700 enables the use of Bloom filters 502 to efficiently execute a read command from host 10. That is, according to various embodiments of the disclosure, the location of data requested in the read command can be determined to a high probability by microprocessor-based controller 133, via Bloom filters 502. As a result, read/write head 127 does not have to seek to SMR bands in one or more intermediate levels of media cache. One such embodiment is described below in conjunction with FIG. 8.

Figure 8:
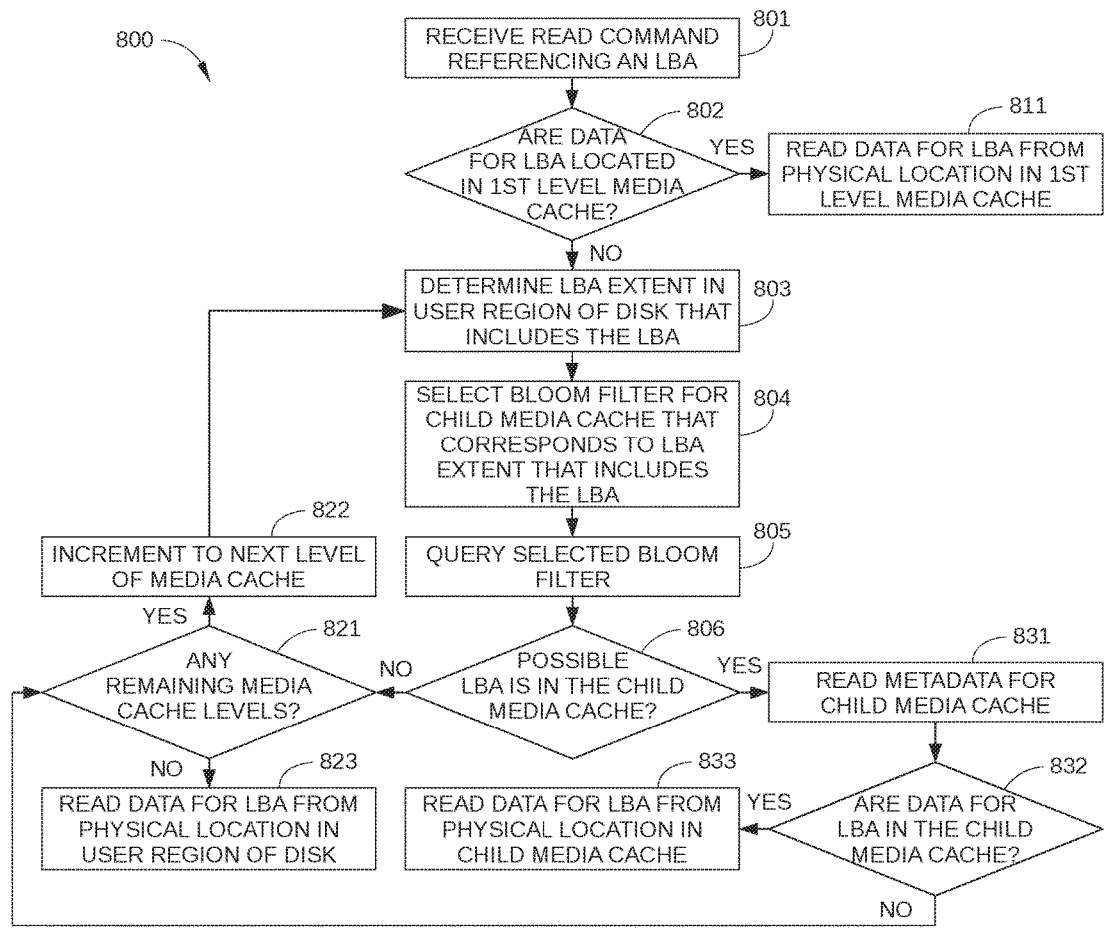
FIG. 8 sets forth a flowchart of method steps for efficiently executing a read command in an SMR HDD that includes a multi-level media cache, according to an embodiment.

FIG. 8 sets forth a flowchart of method steps for efficiently executing a read command in an SMR HDD that includes a multi-level media cache, according to an embodiment. Although the method steps are described in conjunction with HDD 100 in FIGS. 1-7, persons skilled in the art will understand that the method steps may be performed with other types of systems, such as a hybrid HDD that includes a flash memory device. The control algorithms for the method steps reside, in whole or in part, in microprocessor-based controller 133, as software- or firmware-implemented logic, and/or as hardware-implemented logic circuits. Prior to the method steps, Bloom filters 502 are generated and stored in RAM 134, as described above in method 700.

As shown, a method 800 begins at step 801, when microprocessor-based controller 133 receives a read command from host 10. The read command generally references an LBA or a range of LBAs for which host 10 is requesting data to be read, where the LBAs correspond to physical locations in user region 310. The corresponding physical locations are sectors disposed in data storage tracks that are formed on recording surface 112 in an SMR format.

In step 802, microprocessor-based controller 133 determines whether data are stored in a first-level media cache of HDD 100, such as first-level media cache 540. Generally, microprocessor-based controller 133 can make such a determination based on media cache mapping 501, which is stored in RAM 134. If yes, method 800 proceeds to step 811; if no, method 800 proceeds to step 803.

In step 803, microprocessor-based controller 133 determines the LBA extent of user region 310 that includes the LBA or range or LBAs referenced in the read command received in step 801. The LBA extents that can potentially include the referenced LBA are those associated with the current media cache level. For example, when step 802 has immediately preceded step 803, the current media cache level is the second media-cache level, i.e., second-level media cache 550, and the LBA extents that can potentially include the LBA are LBA extents 651-655N. In another example, when the current media cache level is a third media-cache level that is disposed between second-level media cache and user region 310, the LBA extents that can potentially include the referenced LBA are those LBA extents for each child cache of second-level bands 551-55N.

In step 804, microprocessor-based controller 133 selects a Bloom filter 502 for the child media cache (e.g., one of second-level bands 551-55N) that corresponds to the LBA extent determined in step 803. For example, when the LBA of interest is included in LBA extent 651 and the current media-cache level is second-level media cache 550, microprocessor-based controller 133 selects the Bloom filter 502 for second-level band 551.

In step 805, microprocessor-based controller 133 queries the Bloom filter 502 selected in step 804. For example, in some embodiments, microprocessor-based controller 133 feeds an input associated with the LBA of interest into the k hash functions previously used to generate the Bloom filter 502 selected in step 804. In so doing, k array positions are referenced for the array of M bits of the Bloom filter 502 are generated, each having a value of 1 or 0.

In step 806, microprocessor-based controller 133 determines whether there is any possibility that data for the LBA of interest is stored in the child media cache associated with the Bloom filter 502 selected in step 804. Specifically, if the value at any of the referenced array positions for the Bloom filter 502 is 0, there is no possibility that data for the LBA of interest is stored in the child media cache associated with that Bloom filter. If the value of all of the referenced array positions for the Bloom filter 502 is 1, there is a very high probability that data for the LBA of interest is stored in the child media cache associated with the Bloom filter 502 being queried. If there is a possibility that data for the LBA of interest is stored in the child media cache, method 800 proceeds to step 831; if there is no possibility of data for the LBA of interest to be stored in the child media cache, method 800 proceeds to step 821.

In step 811, which is performed in response to data for the LBA of interest being determined to be located in first-level media cache 540, microprocessor-based controller 133 causes data to be read for the LBA from physical locations in first-level media cache 540. Thus, microprocessor-based controller 133 seeks read/write head 127 to the appropriate physical locations in media-cache region 320 and reads the data.

In step 821, which is performed in response to microprocessor-based controller 133 determining that there is no possibility of data for the LBA of interest to be stored in the current child media cache, microprocessor-based controller 133 determines whether there are any remaining media cache levels disposed between the current child media cache and user region 310 of disk 110. If yes, method 800 proceeds to step 822; if no, method 800 proceeds to step 823.

In step 822, microprocessor-based controller 133 increments to the next level of media cache, for example from second-level media cache 550 to another intermediate media cache level disposed between second-level media cache 550 and user region 310. Method 800 then proceeds back to step 803.

In step 823, microprocessor-based controller 133 reads data for the LBA of interest from the physical location in user region 310 that corresponds to that LBA. Thus, microprocessor-based controller 133 seeks read/write head 127 to the appropriate physical location in user region 310 and reads the data.

In step 831, which is performed in response to microprocessor-based controller 133 determining that there is a possibility of data for the LBA of interest to be stored in the current child media cache, microprocessor-based controller 133 causes metadata 603 to be read from the current child media cache. Thus, microprocessor-based controller 133 seeks read/write head 127 to the appropriate physical location in SMR portion 530 of disk 110 and reads the metadata for the current child media cache.

In step 832, microprocessor-based controller 133 determines whether data for the LBA are stored in the current child media cache, based on the metadata read in step 831. If yes, method 800 proceeds to step 833; if no, method 800 proceeds back to step 821.

In step 833, microprocessor-based controller 133 causes data to be read for the LBA of interest from the appropriate physical location in the current child media cache. Thus, microprocessor-based controller 133 seeks read/write head 127 to the appropriate physical location in the current child media cache and reads the data for the LBA of interest. Generally, the metadata read in step 831 indicates in what physical location in the current child media cache the data for the LBA of interest are stored.

In sum, an SMR HDD that includes a multi-level cache is described in which a read command is executed with fewer disk accesses and reduced latency over a conventional SMR HDD. The SMR HDD 100 receives a read command that references an LBA for which data are stored in HDD 100. By employing Bloom filters that are retained in RAM or other quickly accessed memory, HDD 100 can execute the read with as few as a single disk access, even though the data for the LBA may be stored in any of multiple locations on the disk.

While the foregoing is directed to embodiments of the present invention, other and further embodiments of the invention may be devised without departing from the basic scope thereof, and the scope thereof is determined by the claims that follow.

I claim:

1. A method of reading data from a magnetic disk, the method comprising:
   receiving a read command that references an LBA associated with a physical location on the magnetic disk;
   selecting a Bloom filter associated with a cache region of the magnetic disk configured for storing data for a range of LBAs that includes the LBA associated with the physical location, wherein the physical location is included in a shingled magnetic recording region;
   querying the Bloom filter to determine whether there is a possibility that data for the LBA associated with the physical location is stored in the cache region of the magnetic disk; and
   when the query indicates that there is a possibility that data for the LBA associated with the physical location is stored in the cache region, reading metadata stored in the cache region to determine whether data for the LBA associated with the physical location is stored in the cache region.

2. The method of claim 1, wherein the physical location on the magnetic disk is not included in the cache region.

3. The method of claim 1, wherein the cache region comprises a shingled magnetic recording region.

4. The method of claim 1, further comprising, when the metadata stored in the cache region indicate that data for the LBA associated with the physical location is stored in the cache region, reading the data for the LBA associated with the physical location from the cache region.

5. The method of claim 1, further comprising, when the metadata stored in the cache region indicate that data for the LBA associated with the physical location is not stored in the cache region, reading the data for the LBA associated with the physical location from the physical location.

6. The method of claim 1, further comprising:
   when the metadata stored in the cache region indicates that data for the LBA associated with the physical location is not stored in the cache region, selecting an additional Bloom filter associated with an additional cache region of the magnetic disk configured for storing data for an additional range of LBAs that includes the LBA associated with the physical location, wherein the additional range of LBAs is a subset of the range of LBAs that includes the LBA associated with the physical location; and
   performing a query of the additional Bloom filter to determine whether there is a possibility that the data for the LBA associated with the physical location is stored in the additional cache region of the magnetic disk.

7. The method of claim 1, wherein the Bloom filter comprises a bit array with k hash functions associated therewith, and querying the Bloom filter comprises:
   performing the k hash functions on a value for the LBA associated with the physical location to generate k array positions in the bit array; and
   determining whether each of the k array positions has a value of 1.

8. The method of claim 7, wherein each of the k array positions having a value of 1 indicates that there is a possibility that data for the LBA associated with the physical location is stored in the cache region.

9. The method of claim 7, wherein the value for the LBA comprises a numerical value based at least in part on a unique identifier associated with the LBA.

10. The method of claim 9, wherein the physical location on the magnetic disk comprises a sector of the magnetic disk, and the unique identifier associated with the LBA is based at least in part on an identifier of the sector.

11. The method of claim 1, further comprising, prior to selecting the Bloom filter, looking up the LBA in a mapping table that indicates LBAs corresponding to data that are stored in a top-level media cache region on the magnetic disk different from the cache region.

12. The method of claim 11, wherein the mapping table is stored in a volatile solid-state memory associated with controlling I/O operations on the magnetic disk.

13. A data storage device comprising:
a rotatable disk with a writable surface; and
a controller configured to:
receive a read command that references an LBA associated with a physical location on the writable surface;
select a Bloom filter associated with a cache region of the writable surface configured for storing data for a range of LBAs that includes the LBA associated with the physical location, wherein the physical location is included in a shingled magnetic recording region;
query the Bloom filter to determine whether there is a possibility that data for the LBA associated with the physical location is stored in the cache region of the writable surface; and
when the query indicates that there is a possibility that data for the LBA associated with the physical location is stored in the cache region, read metadata stored in the cache region to determine whether data for the LBA associated with the physical location is stored in the cache region.

14. The data storage device of claim 13, wherein the cache region comprises a shingled magnetic recording region.

15. The data storage device of claim 13, further comprising, when the metadata stored in the cache region indicate that data for the LBA associated with the physical location is stored in the cache region, reading the data for the LBA associated with the physical location from the cache region.

16. The data storage device of claim 13, further comprising, when the metadata stored in the cache region indicate that data for the LBA associated with the physical location is not stored in the cache region, reading the data for the LBA associated with the physical location from the physical location.

17. The data storage device of claim 13, further comprising:
when the metadata stored in the cache region indicates that data for the LBA associated with the physical location is not stored in the cache region, selecting an additional Bloom filter associated with an additional cache region of the writable surface configured for storing data for an additional range of LBAs that includes the LBA associated with the physical location, wherein the additional range of LBAs is a subset of the range of LBAs that includes the LBA associated with the physical location; and
performing a query of the additional Bloom filter to determine whether there is a possibility that the data for the LBA associated with the physical location is stored in the additional cache region of the writable surface.

18. The data storage device of claim 13, wherein the Bloom filter comprises a bit array with k hash functions associated therewith, and querying the Bloom filter comprises:
performing the k hash functions on a value for the LBA associated with the physical location to generate k array positions in the bit array; and
determining whether each of the k array positions has a value of 1.

19. The data storage device of claim 18, wherein each of the k array positions having a value of 1 indicates that there is a possibility that data for the LBA associated with the physical location is stored in the cache region.

20. The data storage device of claim 18, wherein the value for the LBA comprises a numerical value based at least in part on a unique identifier associated with the LBA.

* * * * *